United States Patent
Itoh et al.

(10) Patent No.: US 12,304,745 B2
(45) Date of Patent: May 20, 2025

(54) METHOD FOR MANUFACTURING CONVEYANCE DEVICE

(71) Applicant: ITOH DENKI CO., LTD., Kasai (JP)

(72) Inventors: Kazuo Itoh, Kasai (JP); Toshiyuki Tachibana, Kasai (JP); Mitsuo Inoue, Kasai (JP); Akira Takanaga, Kasai (JP)

(73) Assignee: Itoh Denki Co., Ltd., Kasai (JP)

( * ) Notice: Subject to any disclaimer, the term of this patent is extended or adjusted under 35 U.S.C. 154(b) by 735 days.

(21) Appl. No.: 17/496,322

(22) Filed: Oct. 7, 2021

(65) Prior Publication Data

US 2022/0112036 A1 Apr. 14, 2022

(30) Foreign Application Priority Data

Oct. 12, 2020 (JP) ................................ 2020-172068

(51) Int. Cl.
B65G 43/10 (2006.01)

(52) U.S. Cl.
CPC ...... *B65G 43/10* (2013.01); *B65G 2203/0291* (2013.01); *B65G 2203/044* (2013.01)

(58) Field of Classification Search
CPC .................. B65G 43/10; G05B 19/056; G05B 19/41885; G05B 19/4189;
(Continued)

(56) References Cited

U.S. PATENT DOCUMENTS

| | | | | |
|---|---|---|---|---|
| 2007/0208439 | A1* | 9/2007 | Driskill | G05B 19/4186 700/86 |
| 2014/0229226 | A1* | 8/2014 | Thomsen | G06Q 10/0633 705/7.27 |

(Continued)

FOREIGN PATENT DOCUMENTS

| | | | |
|---|---|---|---|
| JP | 2002 297226 A | 10/2002 | |
| JP | 2005-231745 A | 9/2005 | |

(Continued)

OTHER PUBLICATIONS

European Search Report, issued Feb. 10, 2022, in European Patent Application No. 21 20 0475.

(Continued)

*Primary Examiner* — Timothy R Waggoner
(74) *Attorney, Agent, or Firm* — Wood, Phillips, Katz, Clark & Mortimer

(57) ABSTRACT

A method for manufacturing a conveyance device capable of accurately completing the conveyance device imagined by a customer in a relatively short time. One or a plurality of operation confirmation devices that visually confirms an operation of the conveyance device is used. The method includes exhibiting a desired operation of the conveyance device in a video by the operation confirmation device and confirming a required operation of the conveyance device in a specification confirmation step, inputting data for realizing the required operation or realizing an operation similar to the required operation to the operation confirmation device, exhibiting the operation of the conveyance device in a video based on the data that has been input in a virtual operation confirmation step, and inputting the data to an actual individual controller of the conveyance unit in a data input step.

7 Claims, 15 Drawing Sheets

(58) Field of Classification Search
CPC .. G05B 2219/13176; G05B 2219/2621; G05B 2219/31338; G05B 2219/32339; G05B 2219/32351; G05B 2219/32357; G05B 2219/45054; G05B 2219/23452; G05B 2219/23455; G05B 2219/23456; Y02P 90/02

See application file for complete search history.

(56) References Cited

U.S. PATENT DOCUMENTS

| 2018/0162652 | A1* | 6/2018 | Rolfes | G05B 19/4189 |
| 2021/0035345 | A1* | 2/2021 | Wilcox | G06T 13/20 |

FOREIGN PATENT DOCUMENTS

| JP | 2010-232405 A | 10/2010 |
| JP | 2013-230914 A | 11/2013 |
| JP | 2019-171498 A | 10/2019 |

OTHER PUBLICATIONS

Tomas O'Hare & Associates, "FlexSim Brochure", Oct. 21, 2004, Retrieved from the Internet, URL http://toh.ie/wp-content/uploads/2014/12/Flexsim_Brochure_toh.pdf.

Flexsim Brasil: "FlexSim's Conveyor Module", Apr. 7, 2015, XP055890066, Retrieved from the Internet: URL https://www.youtube.com/watch?v=A4i2wrfRuPs&t=57s.

* cited by examiner

LAYOUT

300

LAYOUT

FIG. 13A

| LOGIC NAME | THIRD OCTET | NODE NUMBER |
|---|---|---|
| A | | |
| B | | |
| C | | |
| D | | |

| LOGIC NAME | THIRD OCTET | NODE NUMBER |
|---|---|---|
| A | 1 | 1-10, 57-62, 88 |
| B | 1 | 11-18, 81, 83 |
| C | 1 | 19-55, 72-80, 84 |
| D | 1 | 56, 63-71, 85-87 |

| ITEM | NODE 1 | NODE 2 | NODE 3 | |
|---|---|---|---|---|
| SENSOR SETTING | | | | |
| SENSOR ALARM SETTING | | | | |
| MOTOR TYPE | | | | |
| ROTATION DIRECTION SWITCHING | | | | |
| SPECIAL FUNCTION | | | | |
| NUMBER OF GEAR STAGES | | | | |
| MECHANICAL BRAKE | | | | |
| BRAKE | | | | |
| MOTOR AND MOTOR PORT SETTING SWITCHING | | | | |
| MOTOR LOCK TIMEOUT | | | | |
| SERVO BRAKE CURRENT LIMIT | | | | |
| MOTOR CURRENT LIMIT | | | | |
| SUBSTRATE THERMAL GENERATION TEMPERATURE | | | | |
| SUBSTRATE THERMAL RELEASE TEMPERATURE | | | | |

| ITEM | NODE 1 | NODE 2 | NODE 3 | |
|---|---|---|---|---|
| SENSOR SETTING | DARK-ON | DARK-ON | DARK-ON | |
| SENSOR ALARM SETTING | DARK-ON | DARK-ON | DARK-ON | |
| MOTOR TYPE | FE/VE | FE/VE | FE/VE | |
| ROTATION DIRECTION SWITCHING | CW | CCW | CW | |
| SPECIAL FUNCTION | INVALID | INVALID | INVALID | |
| NUMBER OF GEAR STAGES | THREE STAGES | THREE STAGES | TWO STAGES | |
| MECHANICAL BRAKE | PRESENT | PRESENT | PRESENT | |
| BRAKE | SHORT | SHORT | SHORT | |
| MOTOR AND MOTOR PORT SETTING SWITCHING | MOTOR | MOTOR | MOTOR | |
| MOTOR LOCK TIMEOUT | 1.5sec | 1.5sec | 0.5sec | |
| SERVO BRAKE CURRENT LIMIT | 1.5A | 1.5A | 1.5A | |
| MOTOR CURRENT LIMIT | 5A | 3A | 3A | |
| SUBSTRATE THERMAL GENERATION TEMPERATURE | 90 | 90 | 90 | |
| SUBSTRATE THERMAL RELEASE TEMPERATURE | 80 | 80 | 80 | |

305

METHOD FOR MANUFACTURING CONVEYANCE DEVICE

BACKGROUND OF THE INVENTION

Field of the Invention

The present invention relates to a method for manufacturing a conveyance device such as a conveyer device.

Background Art

A conveyance device is often installed in a delivery site, a pickup site, a warehouse, or the like.

As a form of the conveyance device, a distributed-control conveyance device is known (Patent Document 1). In distributed control, a plurality of conveyance units called zone conveyers are arranged in series or in branches to form a series of conveyance paths, and each conveyance unit has an independent drive motor (drive device). Each conveyance unit is provided with a load presence sensor. The load presence sensor is a sensor that detects presence or absence of an article on the conveyance unit. Each conveyance unit is provided with a control device called a zone controller. The controller incorporates a CPU 201 and a storage unit, and the storage unit stores a computer program (data) constituting a logic circuit (control circuit).

The computer program can be partially or entirely rewritten.

In many cases, main data such as a traveling speed of a conveyer or a waiting time is input as one parameter, and the conveyance unit is operated.

In the distributed-control conveyance device, each conveyance unit constitutes a zone, and the zones are connected to each other.

Then, for example, when a predetermined condition such as an article exists in a certain zone (conveyance unit) and an article (conveyed object) does not exist in the downstream zone is satisfied, a drive motor of the zone (conveyance unit) is activated to send the article to the downstream zone.

A conveyance device including a zone having a branching function is also known (Patent Literature 2).

The zone having a branching function includes, for example, a conveyance unit having a function of moving an article straight or discharging an article in a lateral direction.

An entire design and manufacture of the conveyance device are performed by the following steps: (1) specification determination step; (2) design step; (3) assembly step; and (4) adjustment step.

The specification determination step is a step in which a manufacturer of the conveyance device and their customer discuss to determine conditions (required specifications) required for the conveyance device.

For example, a layout of the conveyance device, a size and weight of the conveyed object, a conveyance speed, a conveyance amount per unit time, and the like are determined in the specification determination step. In a related art, studies are conducted with observation of a drawing on paper or a still image of CAD, and required specifications are determined.

The design step is a step of creating a computer program (data) of each conveyance unit by the manufacturer to meet the required specifications. In some cases, only main data such as parameters are determined.

The computer program is created on the basis of experience of an engineer.

The assembling step is a step of actually combining a plurality of conveyance units to construct a conveyance device. Each conveyance unit stores data of the computer program manufactured in the design step.

The conveyance device may be assembled at an installation site designated by the customer, or may be temporarily installed in a factory of the manufacturer.

The adjustment step is an operation of adjusting motion of the conveyance device by placing the conveyed object on the conveyance device and actually driving the conveyance device. That is, the operation of each conveyance unit is adjusted by conducting a test run the conveyance device.

At this time, in many cases, the computer program of the conveyance unit is corrected.

Patent Document 1: JP 2005-231745 A
Patent Document 2: JP 2013-230914 A

The conventional methods for manufacturing a conveyance device have problems that many correction operations are needed after the conveyance device is installed.

In a method for manufacturing a conveyance device by the prior art, the specification is determined with observation of a drawing on paper or a still image on CAD. However, the customer is not always familiar with a structure or motion of the conveyance device, and it is difficult to understand the motion of the conveyance device.

For example, even if the manufacturer explains that "the conveyance speed is 200 meters per minute", it is difficult for the customer to understand how fast the conveyance speed is in an actual condition. Therefore, there may be a discrepancy in understanding between the customer and the manufacturer at a stage of specification determination.

As described above, in the design step, the computer program (data) is created by the manufacturer on the basis of experience of the engineer so as to meet the required specifications. Or alternatively, the parameter (data) required for the operation is determined.

Here, the designed computer program and parameter are merely designed and selected so as to realize the operation expected by the engineer, and it is not known how the conveyance device actually moves.

In the prior art, the operation is confirmed by conducting a test run of the conveyance device. That is, at the time of the test run, the operation of the entire conveyance device is revealed for the first time.

As described above, the computer program (data) or the parameter (data) created in the design step is merely designed to realize the operation expected by the engineer, and when the test run of the conveyance device is conducted, the actual motion may be different from the motion expected by the engineer. Further, when the object is actually conveyed, an unexpected error may occur. Furthermore, as described above, there is a case where a discrepancy occurs between the customer and the manufacturer at the stage of specification determination in the first place, and there is a case where correction is requested from the customer who has seen the motion of the test run.

Thus, in the prior art method for manufacturing a conveyance device, there need many corrections of the program or the like after the test run, and a considerable period of time may be required until delivery from the manufacturer to the customer.

After the delivery to the customer, there is a case where the customer requests correction of motion whether an error occurs or not, and it may take a considerable period of time to correct the computer program or the like.

An object of the present invention is to focus on the above problem of the prior art and to develop a method for manufacturing a conveyance device capable of accurately completing the conveyance device imagined by a customer in a relatively short time.

SUMMARY OF THE INVENTION

An embodiment to solve the above problem is a method for manufacturing a conveyance device, wherein the conveyance device includes: a host controller; and a plurality of conveyance units each including an individual controller that controls each of the conveyance units, the individual controller including: a control circuit configured to input data regarding control; and a communication unit that communicates with the host controller, and wherein the method includes: (a) confirming a required operation of the conveyance device by exhibiting a desired operation of the conveyance device in a video using at least one operation confirmation device that is configured to visually confirm an operation of the conveyance device; (b) confirming virtually the operation of the conveyance device by exhibiting the operation of the conveyance device in a video based on the data that has been input into the operation confirmation device, the date being for realizing the required operation or an operation similar to the required operation; and (c) inputting the data into the individual controller each of the actual plurality of conveyance units.

The conveyance device is, for example, a conveyer device. In the conveyance device, for example, conveyers may be installed in upper and lower stages, and a lift that transfers an article between these conveyers may be included.

The conveyance device also includes a device that conveys an article in a vertical direction, such as an elevator.

In the method for manufacturing a conveyance device according to the present aspect, the operation confirmation device is used in the specification confirmation step, and the desired operation of the conveyance device is exhibited in a video. This allows a customer to visually recognize motion of the conveyance device and eliminates a discrepancy in recognition between the manufacturer and the customer.

An engineer creates a computer program (data) of each conveyance unit so as to meet a requested specification. Further, parameters (data) are selected so as to match the requested specification. The computer program (data) and the parameters (data) may be examined and created one by one by the engineer, or may be automatically created or selected using a computer.

In the method for manufacturing a conveyance device according to the present aspect, the virtual operation confirmation step is performed. In the virtual operation confirmation step, the data created by the engineer or the automatically created data is input to the operation confirmation device, and the operation of the conveyance device is exhibited in a video on the basis of the input data.

Therefore, the operation of the conveyance device can be confirmed before test run, and the computer program can be corrected.

In the above aspect, it is desirable to further include (d) confirming actually the operation of the conveyance device after step (c) by acquiring log data of the individual controller of each of the conveyance units, inputting the log data to the operation confirmation device, and reproducing the operation of the conveyance device.

The method for manufacturing a conveyance device according the present aspect includes actually operating the conveyance device in a state where the data is input, acquiring log data of the individual controller of each of the conveyance units, and inputting the log data to the operation confirmation device to reproduce the operation of the conveyance device during the test run or operation of the conveyance device in an actual operation confirmation step.

It is therefore possible to reproduce an error of the conveyance device. The engineer can correct the computer program or the like with reference to the reproduced error.

In the above aspect, it is desirable to include (e) correcting the data that is confirmed as an error in step (d).

The present aspect further refines the computer program or the like.

In each of the aspects, it is desirable that the data is corrected to approximate to the required operation in step (b).

When the data for realizing the required operation is input to the operation confirmation device and the operation of the conveyance device is exhibited in a video on the basis of the input data, each unit may not move as expected. In addition, an error unexpected in the beginning may occur.

In the present aspect, the data is corrected so as to approximate to the required operation in the virtual operation confirmation step.

In each of the aspects, desirably, a final specification creator is used to store a plurality of fixed phrases and display-fields corresponding to the plurality of fixed phrases, information about a layout of the conveyance device to be manufactured and data input in step (c), and/or data corrected in step (e) are input into the final specification creator, and a document in which the layout and a description based on the data are written in the display fields is created.

The present aspect facilitates creation of a completed specification to be submitted to the customer.

In each of the aspects, desirably, the individual controller includes a basic control circuit, a parameter required for a specific operation can be input as one of the data, and a parameter for executing the operation of the conveyance device exhibited in step (a) is acquired and is input into the operation confirmation device when step (b) is performed.

The present aspect facilitates implementation of the virtual operation confirmation step.

The method for manufacturing a conveyance device of the present invention can accurately complete the conveyance device imagined by the customer in a relatively short time.

BRIEF DESCRIPTION OF THE DRAWINGS

FIGS. 12A and 12B each illustrate a display screen of a layout section of a final specification creator, wherein FIG. 12A illustrates the display screen before data input and FIG. 12B illustrates the display screen after data input.

FIGS. 13A and 13B each illustrate a display screen of logic display of the final specification creator, wherein FIG. 13A illustrates the display screen before data input and FIG. 13B illustrates the display screen after data input.

FIGS. 14A and 14B each illustrate a display screen of motor specification of the final specification creator, wherein FIG. 14A illustrates the display screen before data input and FIG. 14B illustrates the display screen after data input.

FIG. 15 illustrates a display screen of various specifications of the final specification creator before data input.

FIG. 16 illustrates the display screen of various specifications of the final specification creator after data input.

DETAILED DESCRIPTION OF THE PREFERRED EMBODIMENT

Hereinafter, an embodiment of the present invention will be described in detail.

Figure 1:
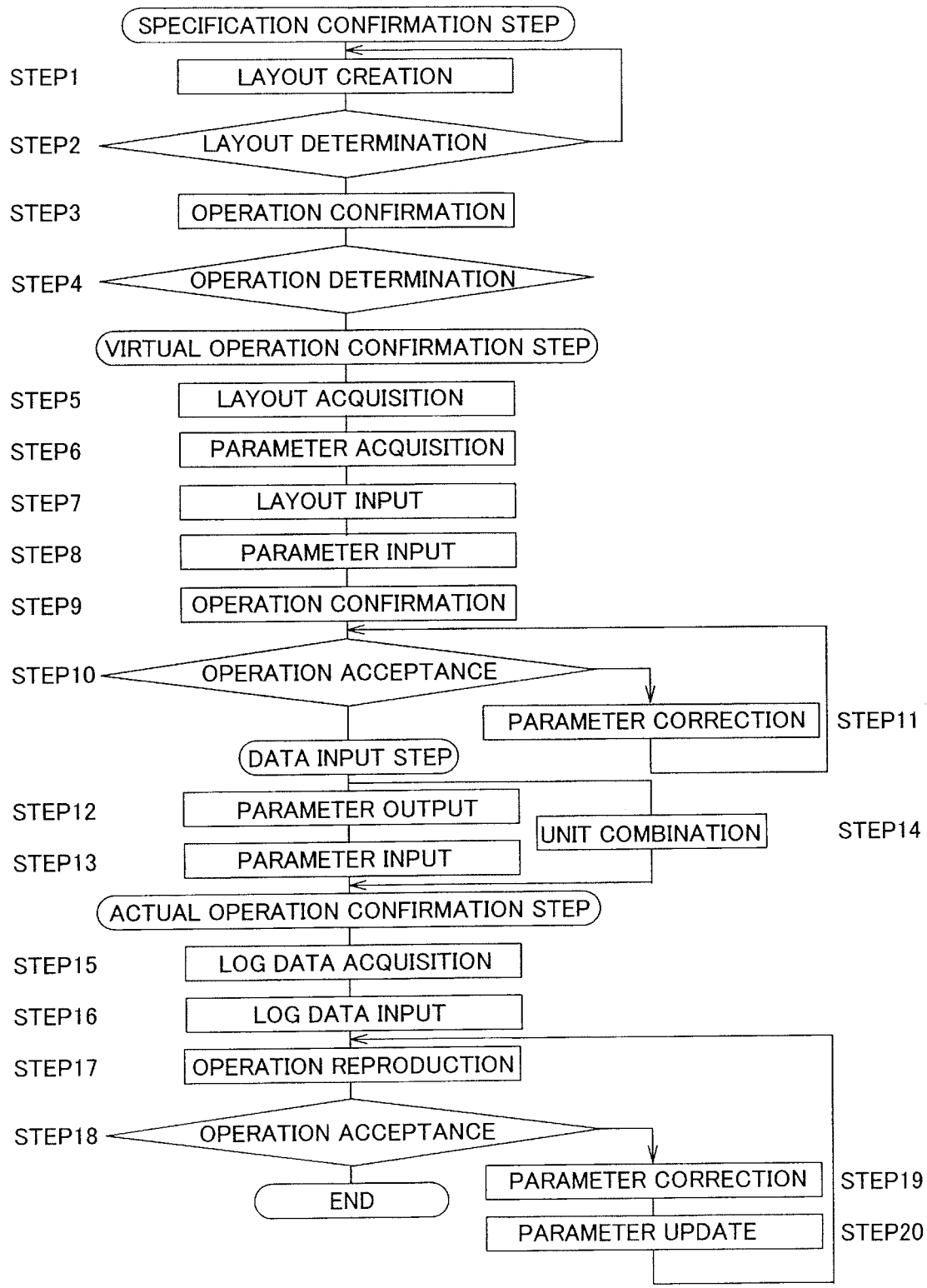
FIG. 1 is a flowchart of a working step of a method for manufacturing a conveyance device according to an embodiment of the present invention.

A method for manufacturing a conveyance device according to the present embodiment completes the conveyance device through the following steps (see FIG. 1).
(1) Specification Confirmation Step
   a: Layout creation step
   b: Operation confirmation step
(2) Virtual Operation Confirmation Step
   a: Layout acquisition step
   b: Layout input step
   c: Parameter acquisition step
   d: Parameter input step
   e: Operation confirmation step
   f: Parameter correction step
(3) Data Input Step
   a: Parameter output step
   b: Parameter input step
   c: Unit combination step
(4) Actual Operation Confirmation Step
   a: Log data acquisition step
   b: Log data input step
   c: Operation reproduction step
   d: Parameter correction step
(5) Data Correction Step
   a: Parameter update step
Subsequently, the following steps are performed.
(6) Final Specification Creation Step
   a: Layout input step
   b: Control logic specifying step
   c: Parameter input step That is, (1) a layout and a motion of a conveyed object are simulated on a screen to show a customer for determination of a specification, (2) operation that is closer to actual operation is displayed on the screen using computer software that executes the motion of an individual controller of each zone in a simulation to embody a development logic, (3) each logic is stored in each zone controller, (4) log data of an actual conveyer device is acquired to confirm real operation, and (5) each logic is corrected.

In addition, a control specification is created as necessary.

Figure 5:
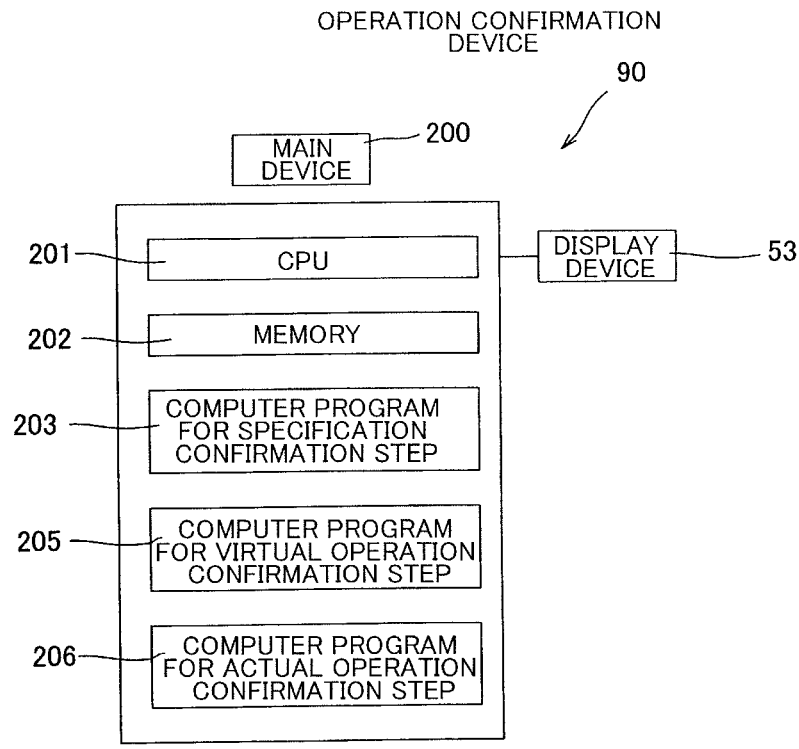
FIG. 5 is a block diagram of an operation confirmation device.

In the method for manufacturing a conveyance device according to the present embodiment, an operation confirmation device 90 is used as a characteristic device. As illustrated in FIG. 5, the operation confirmation device 90 includes a main device 200 and a display device 53, displays a layout of the conveyer device 1 on the display device 53, and exhibits operation of the conveyer device 1 in a video.

The main device 200 is a known computer, and includes a CPU 201 and a memory 202. In the present embodiment, a personal computer is used as the main device 200. In the present embodiment, one personal computer that stores a computer program 203 for specification confirmation step, a computer program 205 for virtual operation confirmation step, and a computer program 206 for actual operation confirmation step is used as the operation confirmation device 90, but each computer program may be stored in a separate personal computer.

Figure 2:
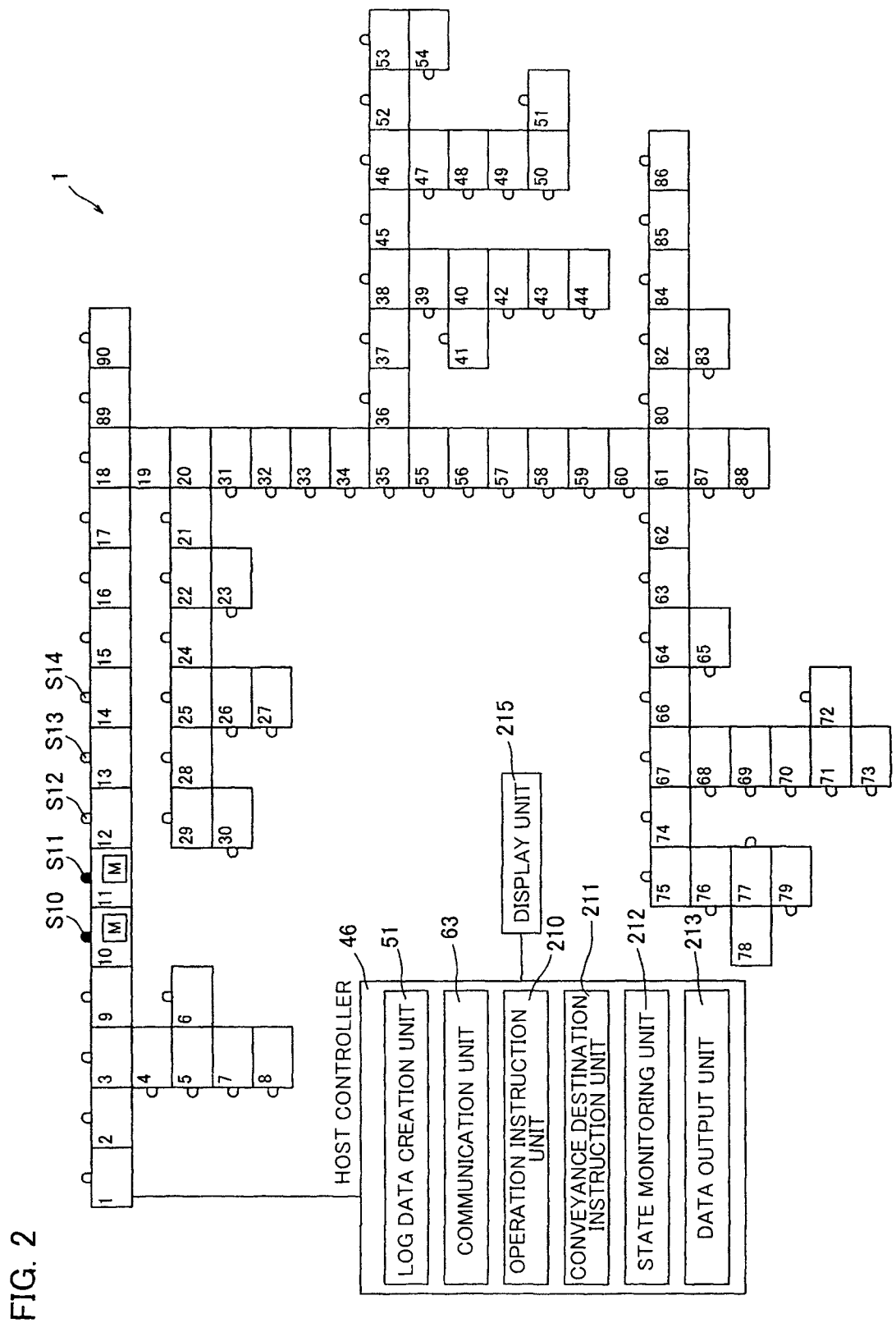
FIG. 2 is a layout of a conveyance device and a display screen of a display device to which operational check is conducted.

As illustrated in FIG. 2, the conveyer device (conveyance device) 1 to be manufactured has a linear part of a conveyance path divided into a plurality of short zones. The conveyer device 1 is a distributed-control device, and includes a host controller 46 that comprehensively controls the operation of the conveyer device and a zone controller (individual controller) 10 that controls each zone (not illustrated in FIG. 2).

Figure 9:
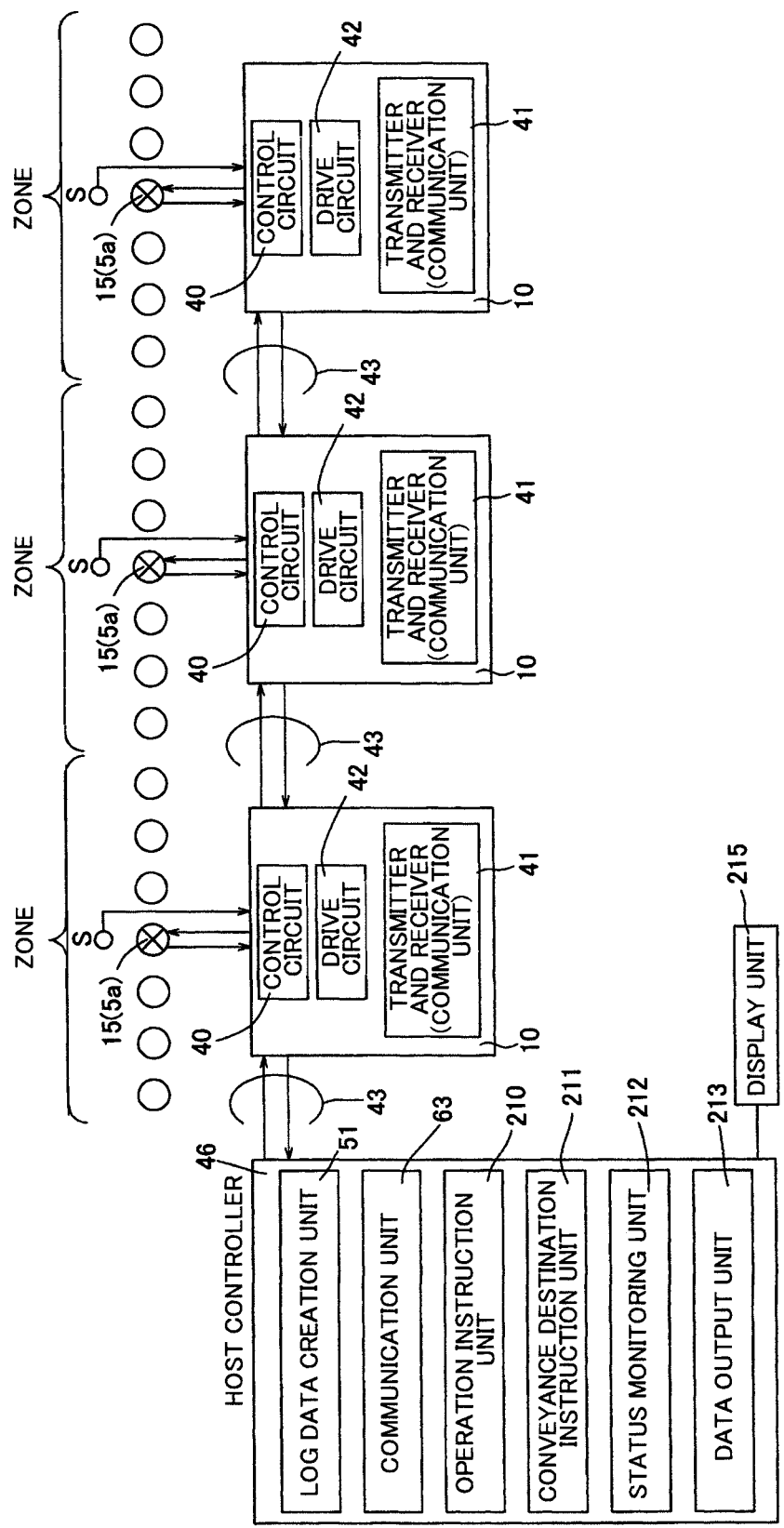
FIG. 9 is a block diagram of zone controllers and a circuit diagram illustrating a relationship between each of the zone controllers and a log data creation unit.

As illustrated in FIGS. 2 and 9, the host controller 46 includes a communication unit 63, an operation instruction unit 210, a conveyance destination instruction unit 211, a state monitoring unit 212, and a data output unit 213 in addition to a log data creation unit 51 to be described later. In addition, the host controller 46 includes a display device 215.

The host controller 46 intercommunicates with each zone controller 10 by the communication unit 63, and exchanges information.

The operation instruction unit 210 instructs activation and stop of the entire conveyer device 1 and activation and stop of the individual zone controllers 10.

The conveyance destination instruction unit 211 instructs a conveyance destination of each article M.

The state monitoring unit 212 monitors a current operation status of the conveyer device 1.

In the present embodiment, the state monitoring unit 212 displays the layout of the conveyer device 1 on the display device 215, and further displays in which zone the article M exists. Further, a video of a movement state of the article M is displayed on the display device 215.

The data output unit 213 stores a parameter of the control logic of each zone controller 10, and outputs the parameter to each zone controller 10 via the communication unit 63.

In the conveyer device 1, a plurality of linear conveyance zones are connected in series to constitute the linear part of the conveyance path. The conveyer device 1 includes a plurality of conveyance redirecting zones and constitutes a branched conveyance path. Further, there are a plurality of destinations for conveying the article M.

One conveyance unit 2 or one conveyance unit 20 are disposed in each zone. In the conveyance units 2 and 20, a mechanical structural part and the zone controller 10 are integrated. As illustrated in FIG. 9, each zone controller 10 is an individual controller having a control circuit 40 that individually controls the conveyance units 2 or 20. The zone controller (individual controller) 10 incorporates a transmitter and receiver (communication unit) 41 that intercommunicates with the host controller 46, and also operates in accordance with a command from the host controller 46.

Figure 3:
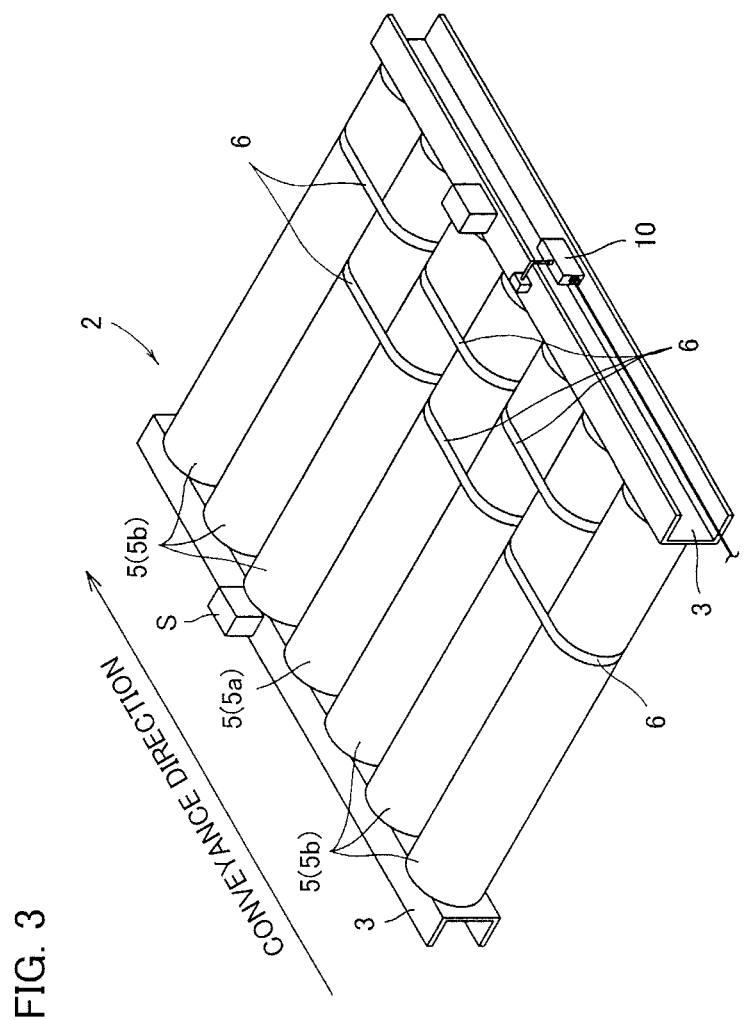
FIG. 3 is a perspective view of a conveyance unit constituting a linear conveyance zone.
Figure 4:
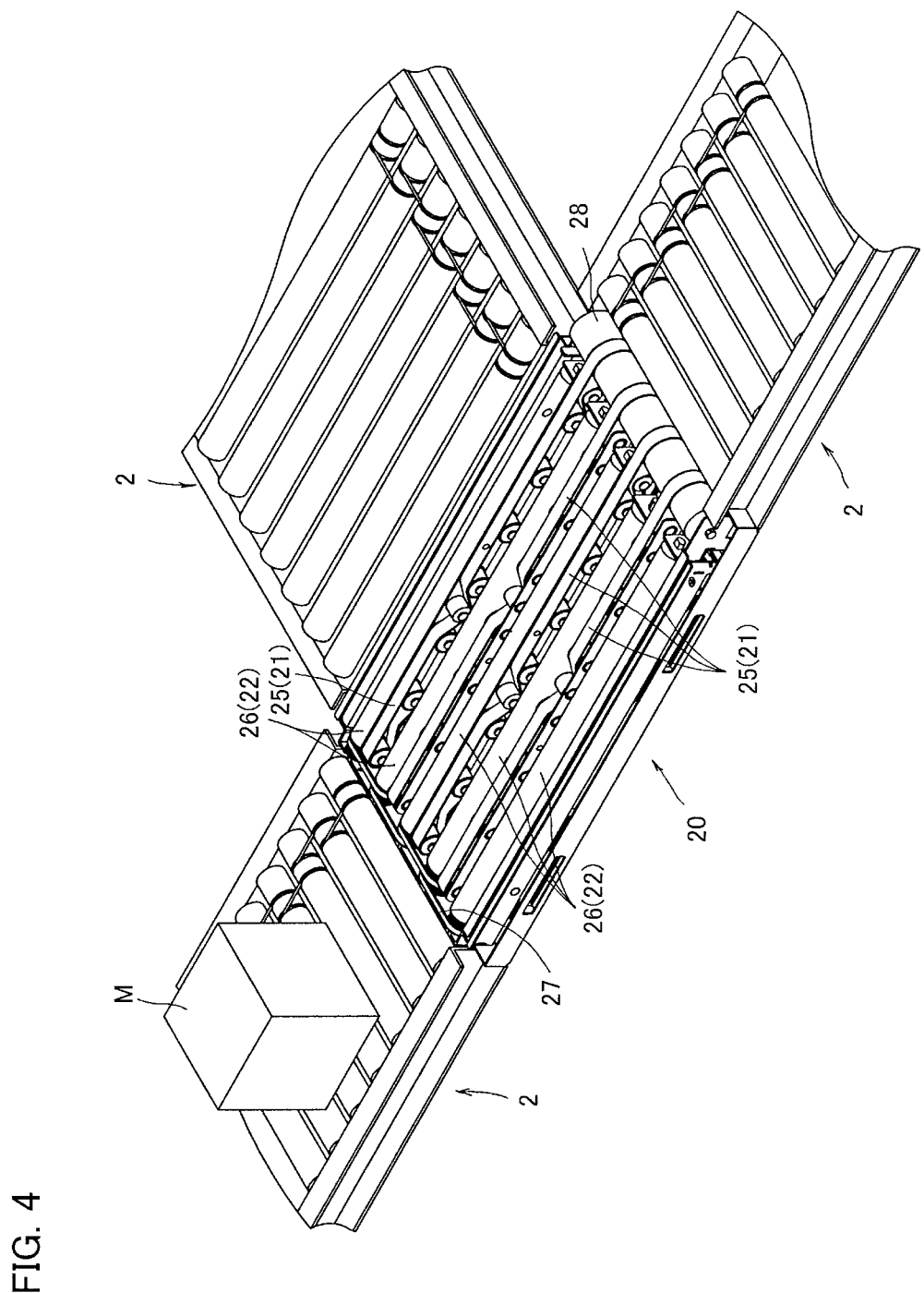
FIG. 4 is a perspective view of the vicinity of a conveyance redirecting zone formed by a conveyance redirector.

The conveyance unit 2 installed in the linear conveyance zone is a representative conveyance unit and is a zone conveyer as illustrated in FIG. 3. The conveyance unit 20 installed in the conveyance redirecting zone is a transfer device as illustrated in FIG. 4. The conveyance unit 20 is also one of the conveyance units.

The conveyance unit 2 is a short roller conveyer in which a plurality of conveyance rollers 5 are pivotally supported at predetermined intervals between a pair of left and right side frames 3 and 3 arranged in parallel. Each of the conveyance rollers 5 includes a freely rotating driven roller 5b and a motor-incorporating roller 5a. In the present embodiment, only one motor-incorporating roller 5a is provided, and the other rollers are all driven rollers 5b. A drive motor (not illustrated) is incorporated as a drive device in the motor-incorporating roller 5a. The incorporated drive motor has a function of outputting a pulse signal in accordance with rotation. The same applies to the drive motors of the other motor-incorporating rollers. Note that the pulse signal is an example of "information regarding rotation when the drive motor is driven".

A transmission belt 6 is wound around adjacent conveyance rollers 5 in the conveyance unit 2. Therefore, a rotational driving force of the motor-incorporating roller 5a can be transmitted to all the driven rollers 5b.

As illustrated in FIG. 3, the conveyance unit 2 is provided with a load presence sensor S. The load presence sensor S is provided on the side frame 3. The load presence sensor S is located near a downstream end.

The load presence sensor S detects presence or absence of an article on the conveyance unit 2.

As the load presence sensor S, a photoelectric sensor can be used, and a light emitting element (not illustrated) such as a light emitting diode or an infrared diode is provided on the side frame 3 opposite to the load presence sensor S.

Next, the conveyance redirecting zone will be described. The conveyance unit 20 installed in the conveyance redirecting zone is a transfer device as illustrated in FIG. 4. The conveyance unit 20 includes a redirecting mechanism that changes a conveyance direction or a receiving direction.

As illustrated in FIG. 4, the conveyance unit 20 includes a main transport conveyer 21, a sub transport conveyer 22, and a lift (not illustrated).

The main transport conveyer 21 of the conveyance unit 20 is a belt conveyer in which a plurality of thin belts 25 are arranged at regular intervals. The main transport conveyer 21 is driven by a motor-incorporating roller 28 provided at an end.

The sub transport conveyer 22 of the conveyance unit 20 is a roller conveyer. In the sub transport conveyer 22, a plurality of rollers 26 are arranged in parallel, and these rollers are interlocked by a belt 27. One of the plurality of rollers 26 constituting the sub transport conveyer 22 is a motor-incorporating roller, and all the rollers 26 rotate by driving the motor-incorporating roller.

As illustrated in FIG. 4, the sub transport conveyer 22 is arranged such that the rollers 26 exist between the belts 25 of the main transport conveyer 21.

In order for the article M placed on the conveyance unit 20 to travel straight, the lift (not illustrated) causes the main transport conveyer 21 to protrude above the sub transport conveyer 22, and the motor-incorporating rollers 28 of the main transport conveyer 21 are driven to run the belt 25.

In order to discharge the article M placed on the conveyance unit 20 in a lateral direction, after the article is drawn into the main transport conveyer 21, the sub transport conveyer 22 is raised and the main transport conveyer 21 is lowered by the lift (not illustrated) to allow the sub transport conveyer 22 to protrude above the main transport conveyer 21, and the motor-incorporating roller of the sub transport conveyer 22 is driven to rotate the rollers 26.

The conveyance unit 20 is also provided with a load presence sensor (not illustrated). A zone controller (not illustrated) is also attached to the conveyance unit 20.

A storage (not illustrated) is built in the zone controller 10, and a control logic (specifically, a control program) that controls a zone in charge is stored in the storage.

Further, a parameter required for a specific operation can be input to the zone controller 10 as one datum of data.

For example, parameters such as a conveyance speed, a timing to start driving, and a timing to stop driving can be input as one of the data.

The conveyer device (conveyance device) 1 to be manufactured is obtained by joining the conveyance units 2 and 20.

In the method for manufacturing a conveyance device according to the present embodiment, a specification confirmation step is first performed. The specification confirmation step is a step of determining a specification of the conveyer device 1 to be manufactured between the manufacturer and the customer. The specification confirmation step includes a layout creation step and an operation confirmation step.

In the specification confirmation step, the manufacturer listens to the customer, and the layout of the conveyer device 1 as illustrated in FIG. 2 is schematically displayed on the display device 53 using the computer program 203 for specification confirmation step of the operation confirmation device 90 (step 1). In many cases, a picture of the host controller 46 is not displayed.

A figure displayed on the display device 53 is an outline figure imitating the conveyer device 1, and is a connection of rectangular figures imitating the conveyance units 2 and 20.

The customer and the manufacturer discuss and first determine the layout of the conveyer device 1 (step 2). The determined layout of the conveyer device 1 is displayed on the display device 53.

Next, the motion of the conveyer device 1 is determined by the operation confirmation step.

Specifically, as illustrated in FIG. 2, the article M is virtually placed on the display device 53, and the article is moved on the screen.

In the operation confirmation step, the conveyance destination, the conveyance speed, conditions for determining the conveyance destination of the article, and the like are discussed, and the motion is virtually displayed on the display device 53 (step 3).

In this way, the specification of the conveyer device 1 is determined (step 4).

Subsequently, a virtual operation confirmation step is performed. The virtual operation confirmation step is a work performed by an engineer, and is performed using the computer program 205 for virtual operation confirmation step of the operation confirmation device 90.

The computer program 205 for virtual operation confirmation step of the operation confirmation device 90 includes a program capable of displaying a video of the operation of the conveyance units 2 and 20 in accordance with the control logic of each zone controller 10. That is, the computer program 205 for virtual operation confirmation step stores a circuit equivalent to the control circuit 40 including a basic control circuit and the individual control logic of each zone controller 10.

In addition, it is possible to input parameters required for specific operation of the conveyance units 2 and 20 and display a video of motion according to the parameters on the screen of the display device 53. For example, parameters such as the conveyance speed, the timing to start driving, and the timing to stop driving can be input to the operation confirmation device 90, and the motion according to the parameters can be displayed as a video on the screen.

The virtual operation confirmation step includes a layout acquisition step, a parameter acquisition step, a layout input step, a parameter input step, an operation confirmation step, and a parameter correction step.

In the layout acquisition step, information on the layout determined in the specification confirmation step as a preceding step is acquired (step 5) and input to the computer program 205 for virtual operation confirmation step (step 7). That is, the layout determined in the specification confirmation step is copied to the computer program 205 for virtual operation confirmation step.

In the parameter acquisition step, parameters necessary for operating the conveyance units 2 and 20 as determined are acquired from the operation determined in the virtual operation confirmation step as a preceding step (step 6) and copied to the computer program 205 for virtual operation confirmation step.

Then, the copied parameters are allocated to each zone controller 10 on the computer program 205 for virtual operation confirmation step (step 8).

The size, weight, friction coefficient, and the like of the object to be conveyed are input to the computer program 205 for virtual operation confirmation step as other parameters.

In the operation confirmation step, a video of the operation of each of the conveyance units 2 and 20 is displayed on the screen in accordance with the control logic and the parameters (step 9).

Specifically, the article M is virtually placed on the display device 53, and the article M is moved on the screen. At this time, each zone controller 10 is moved in accordance with the input control logic and parameters.

The operation determined in the specification confirmation step as the preceding step is a desired operation, and the weight of the article M, the friction coefficient, time from a startup to a steady operation of each of the conveyance units 2 and 20, time required for a stop, a state of the sensors, a method for controlling each zone controller 10, and the like are not considered.

Although the control logic and the parameters obtained in the virtual operation confirmation step are input and displayed in a video for confirmation, the operation determined in the specification confirmation step cannot be mostly reproduced in the operation confirmation step.

Therefore, in the parameter correction step, the parameter is corrected so as to almost closely reproduce the operation determined in the specification confirmation step as the preceding step (steps 10 and 11).

Subsequently, a data input step is performed. The data input step includes a parameter output step (step 12), a parameter input step (step 13), and a unit combination step (step 14).

The parameter output step is a step of extracting data of the corrected parameter from the operation confirmation device 90, and the parameter input step is a step of inputting the data to each individual zone controller 10. That is, the data of the parameters is copied from the operation confirmation device 90 to each zone controller 10 by the parameter output step and the parameter input step.

In parallel with this step, the unit combination step is performed, the conveyance units 2 and 20 are connected in accordance with a predetermined layout, and the conveyer device is mechanically assembled.

The conveyer device 1 may be assembled at a place designated by the customer or at a factory of the manufacturer.

The parameter input step may be performed before the unit combination step or after the unit combination step.

For example, at a factory of the manufacturer or the like, parameters may be input to each conveyance units 2 and 20 in a disassembled state one by one, and thereafter, the conveyer device 1 may be mechanically assembled by combining the conveyance units 2 and 20.

Alternatively, the conveyer device 1 may be mechanically assembled by combining each conveyance units 2 and 20 first, and the data of the parameters may be input to each zone controller 10 in this state.

In a case where the data of the parameters is input to each zone controller 10 after the conveyer device 1 is mechanically assembled, it is desirable to use the data output unit 213 of the host controller 46.

That is, it is desirable to cause the host controller 46 to store the parameters of the control logic of each zone controller 10, output the parameters to each zone controller 10 via the communication unit 63, and input the data of the parameters to each zone controller 10.

Subsequently, an actual operation confirmation step is performed.

The actual operation confirmation step is a work performed by an engineer, and is performed using the computer program 206 for actual operation confirmation step of the operation confirmation device 90.

The computer program 206 for actual operation confirmation step of the operation confirmation device 90 includes a program capable of displaying a video of the operation of each zone controller 10. That is, a circuit equivalent to the basic control circuit of each zone controller 10 is stored in the computer program 206 for actual operation confirmation step.

Further, the operation of the conveyer device 1 can be schematically reproduced on the basis of the log data. Furthermore, an operation status of each drive motor and an operation status of the load presence sensor S from moment to moment can be expressed by a video.

That is, the computer program 206 for actual operation confirmation step includes a computer program for creating operation reproduction video data and a computer program for creating energization state reproduction video data.

The actual operation confirmation step includes a log data acquisition step, a log data input step, an operation reproduction step, and a parameter correction step.

In the log data acquisition step, the article is actually placed on the conveyer device 1, the conveyer device 1 is driven, and the article M is actually conveyed. Then, log data at that time is acquired (step 15). That is, information regarding an on-off status of the drive motor 15 of the conveyance units 2 and 20, a rotation speed of the drive motor 15, an energization state of the control circuit, and an on-off status of switches constituting the sequence circuit at a same time is acquired.

The log data acquisition step is performed for several tens of hours or several days. In some cases, the log data acquisition step is continued even after the conveyer device 1 is delivered from the manufacturer to the customer.

In the virtual operation confirmation step as the preceding step, a video of an operation close to an actual motion is displayed, but in many cases, when the conveyer device is actually assembled and the article is conveyed, the motion is different from an intended motion.

In the present embodiment, during the actual operation of the conveyer device 1 in the log data acquisition step, information regarding the on-off status of the drive motor 15 of each of the conveyance units 2 and 20, the rotation speed of the drive motor 15, the energization state of the control circuit, and the on-off status of the switches constituting the sequence circuit is acquired.

The acquired log data is input to the operation confirmation device 90 (step 16).

Then, the actual motion of the conveyer device 1 is reproduced in a video on the screen by the operation reproduction step. A display M imitating the article is performed on the basis of the operation status of the load presence sensor S included in the log data. Specifically, in a case where the load presence sensor S of the real conveyer device 1 detects the presence of an article at a specific time and a record of the detection exists in the log data, the display M imitating the article M is displayed in the virtual zone displayed on the display device 53 (step 17).

Further, in a zone in which the drive motor 15 of the real conveyer device 1 is energized, a video with motion such as wavy motion is displayed in the virtual zone.

When the drive motor 15 in the zone where the article is placed in the real conveyer device 1 is energized, a video in which the virtual display M is moving is exhibited. A moving speed and a moving distance are determined by an interval and a total number of pulses transmitted by the drive motor 15.

Further, with a click on a specific zone, a video of the energization state of the conveyance units 2 and 20 constituting the zone is displayed.

Further, the energization state of each of the conveyance units 2 and 20 from moment to moment is displayed on the display device 53.

Even in a case where there is some kind of error in the real conveyer device 1, the load presence sensor S, a driving status of the drive motor 15, and the like at that time are recorded in the log data. It is therefore possible to reproduce an occurrence situation of the error virtually. Further, a state of an electric circuit at that time can be confirmed. Thus, a cause of the error can be easily found.

During test run, some kind of error is often found. When the reproduced operation is unacceptable for such a reason that an error is found (step 18), the electric circuit of the zone controller is checked, and the parameters are corrected (step 19).

Then, the parameter of each zone controller 10 is rewritten to the parameter corrected in the parameter correction step (step 20).

Then, the actual motion of the conveyer device 1 is reproduced in a video on the screen of the display device 53 again by the operation reproduction step. When the reproduced operation is acceptable (step 18), the work is terminated.

A final specification creation step is a step of creating a control specification and the like to be delivered to the customer.

The final specification creation step is a step of creating a control specification or creating an auxiliary material for creating the control specification by capturing the data created in the specification confirmation step or the virtual operation confirmation step.

Hereinafter, devices used in the specification confirmation step, the operation confirmation step, the virtual operation confirmation step, and the final specification creation step will be described.

Specification Confirmation Step

Figure 6:
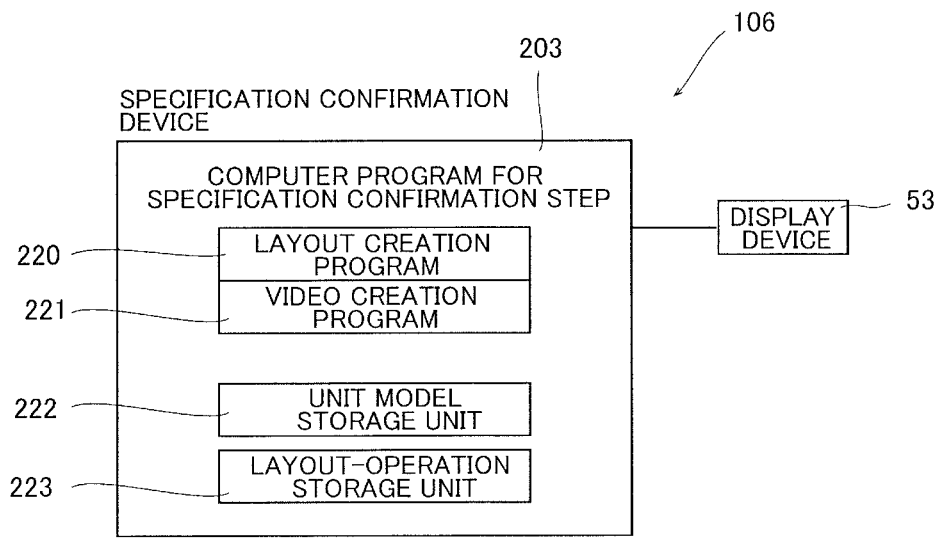
FIG. 6 is a block diagram of a specification confirmation device.

The specification confirmation step is performed using a specification confirmation device 106 as illustrated in FIG. 6. The specification confirmation device 106 is a part of a function of the operation confirmation device 90, and FIG. 6 is obtained by extracting necessary software and the memory 202 from the operation confirmation device 90 and displaying the extraction more in detail.

As illustrated in FIG. 6, the computer program 203 for specification confirmation step includes a layout creation program 220 and a video creation program 221. The specification confirmation device 106 includes a unit model storage unit 222 and a layout-operation storage unit 223.

The unit model storage unit 222 stores a figure (hereinafter, a model diagram) imitating the conveyance units 2 and 20, and a model diagram imitating an article receipt section and an article removal section. In the present embodiment, a rectangular figure is stored as the model diagram imitating the conveyance units 2 and 20.

The model diagram has any shape, and for example, a model diagram representing a linear conveyance path and a model diagram representing a branch may be different from each other.

The layout creation program 220 is a drawing program, and creates a layout of the conveyer device 1 using a known mouse or keyboard. To create a layout, the above-described model diagram is copied to an arbitrary position to create a diagram.

Then, the created layout of the conveyer device 1 is displayed on the display device 53.

In the operation confirmation step, the video creation program 221 is used, the article M is virtually placed on a drawing of the display device 53, the article M is moved on the screen, the conveyance speed and the like are visually confirmed, and the layout and motion of the conveyer device 1 are determined after consultation between the customer and the manufacturer.

The determined layout and operation are stored in the layout-operation storage unit 223.

Virtual Operation Confirmation Step and Data Correction Step

Figure 7:
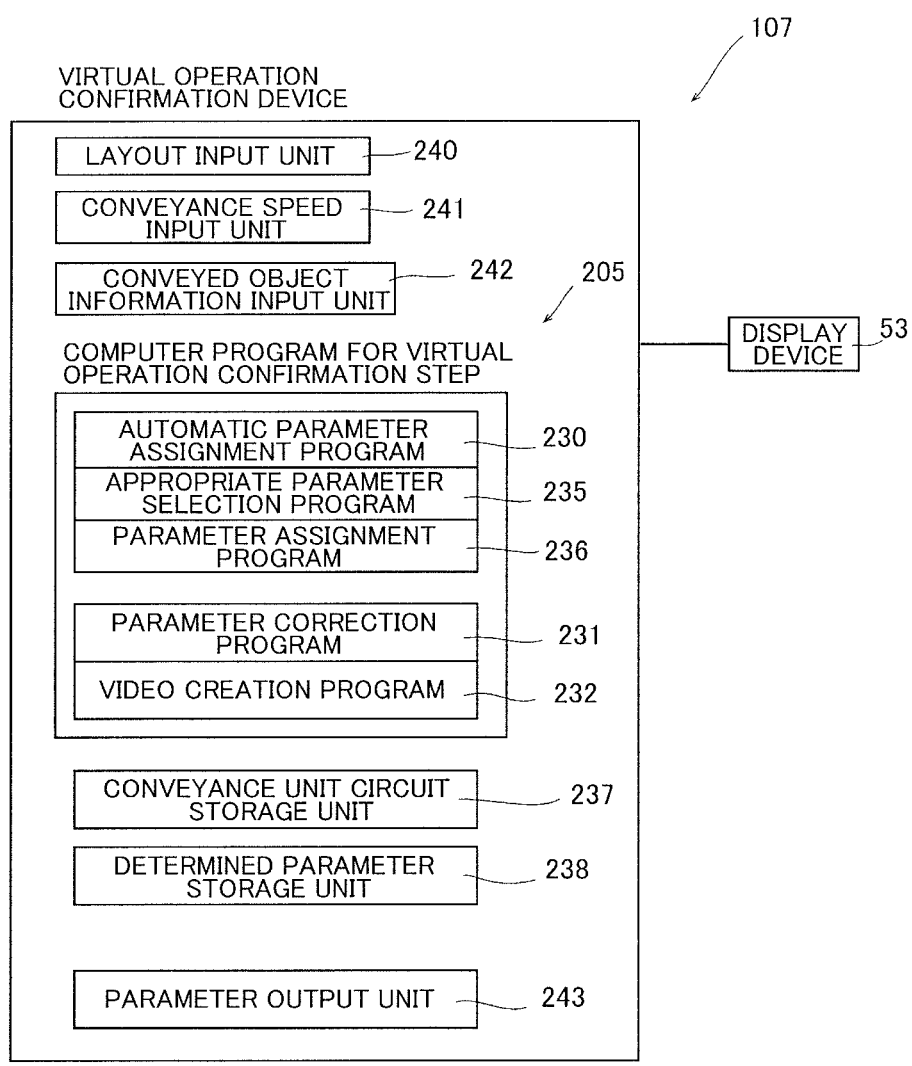
FIG. 7 is a block diagram of a virtual operation confirmation device.

The virtual operation confirmation step and a data correction step are performed using a virtual operation confirmation device 107 as illustrated in FIG. 7. The virtual operation confirmation device 107 is a part of the function of the operation confirmation device 90, and FIG. 7 is obtained by extracting necessary software and the memory 202 from the operation confirmation device 90 and displaying the extraction more in detail.

The computer program 205 for virtual operation confirmation step includes an automatic parameter assignment program 230, a parameter correction program 231, and a video creation program 232. The automatic parameter assignment program 230 further includes an appropriate parameter selection program 235 and a parameter assignment program 236.

The virtual operation confirmation device 107 includes a conveyance unit circuit storage unit 237 and a determined parameter storage unit 238.

The virtual operation confirmation device 107 includes a layout input unit 240, a conveyance speed input unit 241, and a conveyed object information input unit 242 as input units, and includes a parameter output unit 243 as output unit.

The conveyance unit circuit storage unit 237 stores a control circuit (actually, a control program) incorporated in each zone controller 10.

The layout input unit 240 receives information on the determined layout from the layout-operation storage unit 223 of the specification confirmation device 106 described above.

The conveyance speed input unit 241 receives the conveyance speed required for each of the conveyance units 2 and 20 from the layout-operation storage unit 223 of the specification confirmation device 106.

Furthermore, the size, weight, friction coefficient, and the like of the object to be conveyed are input by the conveyed object information input unit 242.

In the virtual operation confirmation device 107, the conveyance units 2 and 20 are virtually disposed in accordance with the layout input by the layout input unit. An actual circuit of each of the conveyance units 2 and 20 is virtually stored in each of the conveyance units 2 and 20.

The automatic parameter assignment program 230 is a program that implements the parameter acquisition step. By the appropriate parameter selection program 235 included in the automatic parameter assignment program 230, an appropriate parameter to be input to each of the conveyance unit 2 and 20 is selected or calculated from the input conveyance speed required for each of the conveyance units 2 and 20, the size, weight, friction coefficient, and the like of the object to be conveyed.

Then, by the parameter assignment program 236, the selected parameter is assigned to the circuit of each of the conveyance units 2 and 20 that are virtually arranged.

Then, by the virtual operation confirmation device 107, the motion of each of the conveyance units 2 and 20 in a state where the selected parameter is assigned is specifically exhibited in a video.

As described above, even if the parameters obtained in the virtual operation confirmation step are input and displayed in a video, in many cases, the operation determined in the specification confirmation step cannot be reproduced. The virtual operation confirmation device according to the present embodiment includes the parameter correction program 231, and the parameters can be manually corrected using the parameter correction program 231.

The corrected parameters are stored in the determined parameter storage unit 238.

Then, the parameter is output to each real zone controller 10 by the parameter output unit 243 as necessary.

Actual Operation Confirmation Step

Figure 8:
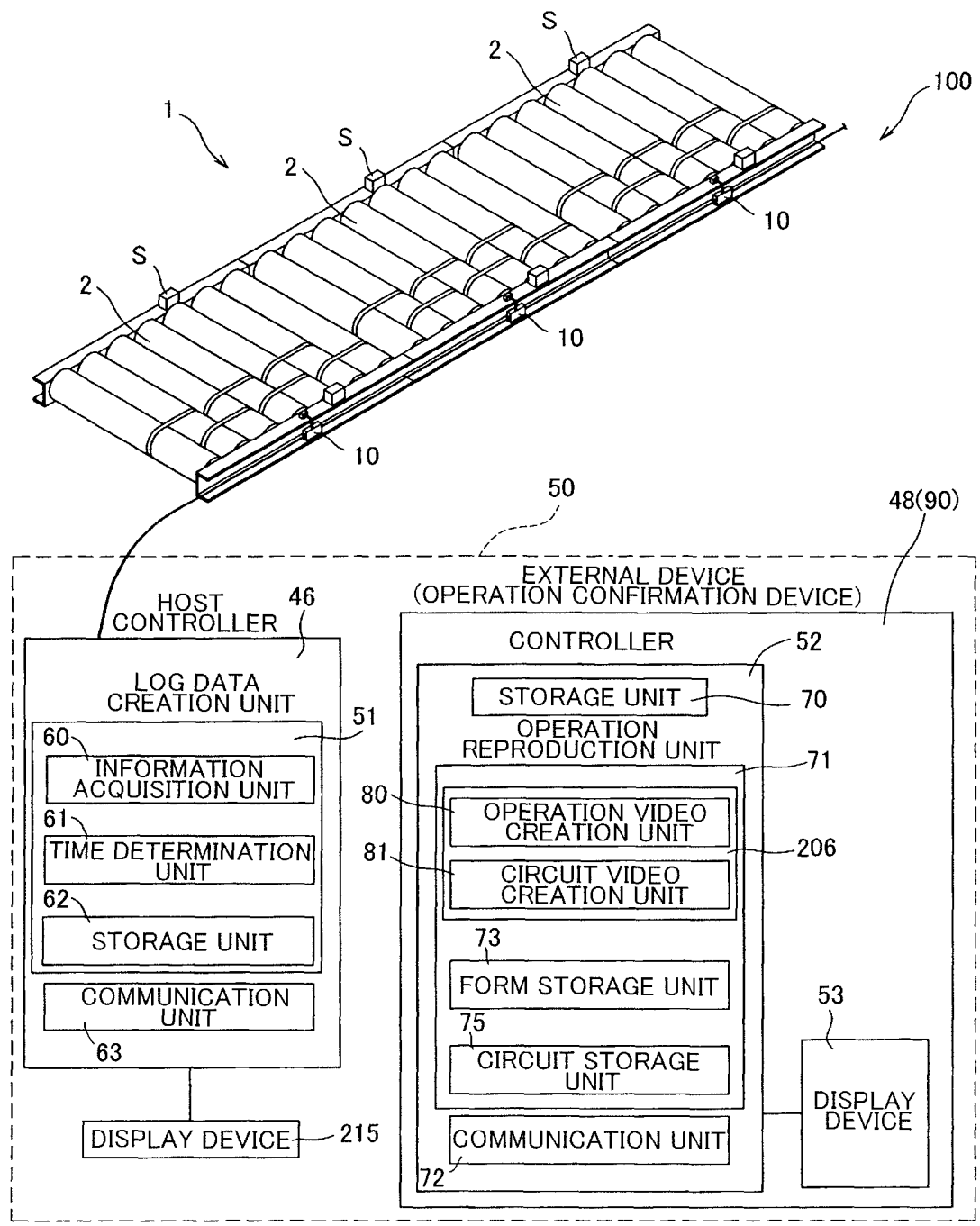
FIG. 8 is a conceptual diagram of a conveyer system including the operation confirmation device of the conveyance device according to the embodiment of the present invention.

The actual operation confirmation step is performed using an actual operation confirmation device 50 illustrated in FIG. 8. FIG. 8 conceptually illustrates a conveyer system 100 including the actual operation confirmation device 50 of the conveyance device and the conveyer device 1 to be confirmed.

As illustrated in FIG. 8, the actual operation confirmation device 50 according to the present embodiment includes the log data creation unit 51 and an external device 48. In the present embodiment, the log data creation unit 51 is incorporated in the host controller 46 of the conveyer device 1.

The external device 48 is a part of the function of the operation confirmation device 90 described above, and the external device 48 in FIG. 8 extracts necessary software and the memory 202 from the operation confirmation device 90 and displays the extraction more in detail.

That is, the external device 48 is a known personal computer, a mobile terminal, or the like, and includes the controller 52 and the display device 53.

Further, a storage unit 70, a communication unit 72, and an operation reproduction unit 71 are incorporated in the controller 52.

The actual operation confirmation device 50 according to the present embodiment can create log data individually recording an operation state of each of the conveyance units 2 and 20 in the real conveyer device 1, and confirm the operation of the article when each conveyance unit is operated in accordance with the log data and the state of the electric circuit at that time by displaying the operation on the display device 53.

To supplement the above description of the conveyer device 1, a specific address is set for each zone of the conveyer device 1 to be manufactured. For convenience, it is assumed that addresses of 1 to 88 are assigned as illustrated in FIG. 2. In the present embodiment, the address of a first zone is 1, and the address of a second zone is 2. Hereinafter, addresses are sequentially assigned.

The address of each zone is stored in the zone controller (individual controller) 10 of each zone.

As described above, each zone includes the zone controller 10 and the load presence sensor S. The zone controller 10 supplies power to the drive motor 15 of the conveyance units 2 and 20 in each zone, and drives and stops the drive motor 15 of the conveyance units 2 and 20 in each zone. That is, the zone controller 10 includes a control circuit 40 that controls the drive motor 15 as illustrated in FIG. 9, and the control circuit 40 includes a drive circuit 42. A part or all of the control circuit 40 is a sequence circuit.

The transmitter and receiver (communication unit) 41 is incorporated in the zone controller 10.

The zone controller 10 is an individual controller that individually controls each conveyance unit.

The zone controllers 10 are provided in all the zones, and the adjacent zone controllers 10 are connected to each other by a signal line 43. Further, a signal of the load presence sensor S of each zone is input to each zone controller 10.

The conveyer device 1 includes the host controller 46, and the host controller 46 is also connected to the zone controller 10 by a signal line.

In the present embodiment, each zone controller 10 and the host controller 46 intercommunicate by a communication unit. By the communication unit, the information on the load presence sensor S and the information on a driving status of the zone are input from each zone controller 10 to the host controller 46.

Specifically, the on-off status of the drive motor 15 of each of the conveyance units 2 and 20, the rotation speed of the drive motor 15, the energization state of the control circuit 40, and the like are input to the host controller 46. In the present embodiment, since the zone controller 10 includes a sequence circuit, an on-off status and an energization state of a switch, a timer, and others in the circuit are all input to the host controller 46. Pulse signals generated in accordance with the rotation of the drive motor 15 are also all input to the host controller 46.

Information regarding the on-off status of the drive motor 15 of the conveyance units 2 and 20, the rotation speed of the drive motor 15, the energization state of the control circuit 40, and the on-off status of the switches constituting the sequence circuit at the same time is input to the host controller 46.

That is, every information at the same time in each zone is input to the host controller 46.

Next, the actual operation confirmation device 50 will be described.

The actual operation confirmation device 50 according to the present embodiment includes the log data creation unit 51 incorporated in the host controller 46 and the external device 48 installed at a separate position.

The log data creation unit 51 includes an information acquisition unit 60, a time determination unit 61, a storage unit 62, and the communication unit 63.

The time determination unit 61 is a clock.

The information acquisition unit 60 is realized by a computer program, and acquires all the information of the load presence sensor S transmitted from the zone controller 10 of each of the conveyance units 2 and 20 to the host controller 46 and the driving status of each zone.

The information acquisition unit 60 acquires information regarding the on-off status of the drive motor 15 of the conveyance units 2 and 20, the rotation speed of the drive motor 15, the energization state of the control circuit 40, and the on-off status of switches constituting the sequence circuit at the same time.

Then, the information acquired by the information acquisition unit 60 is stored in the storage unit 62 as log data together with a time of the acquisition of the information.

The information in the storage unit 62 is continuously accumulated. Further, the information in the storage unit 62 is organized and stored for each operation period of the conveyer device 1. For example, the information is sorted out as "information on the conveyer device 1 on May 20, 2020" and "information on the conveyer device 1 on May 21, 2020" and stored as individual files.

When a memory capacity is insufficient, past information is automatically erased.

The information accumulated in the storage unit 62 is transmitted to the external device 48 via the communication unit 63. The communication unit 63 may use, for example, an Internet line.

Next, the external device 48 will be described. In the present embodiment, the operation confirmation device 90 also serves as the external device 48. The external device 48 illustrated in FIG. 8 is obtained by extracting a part functioning as the external device 48 of the operation confirmation device 50 from the actual operation confirmation device 90.

The external device 48 includes the controller 52 and the display device 53.

The controller 52 includes the storage unit 70, the operation reproduction unit 71, and the communication unit 72.

The communication unit 72 communicates with the communication unit 63 of the log data creation unit 51, and the external device 48 acquires the log data stored in the storage unit 62 of the log data creation unit 51. The log data acquired by the communication unit 72 is stored in the storage unit 70.

The operation reproduction unit 71 is realized by a program including the computer program 206 for actual operation confirmation step and a storage unit, and creates operation reproduction video data that schematically reproduces the operation of the conveyer device 1 and energization state reproduction video data that expresses the operation state of each drive motor and the operation status of the load presence sensor S from moment to moment in a video on the basis of the log data.

That is, the operation reproduction unit 71 includes, as the computer program 206 for actual operation confirmation step, a computer program as an operation video creation unit 80 that creates operation reproduction video data and a computer program as a circuit video creation unit 81 that creates energization state reproduction video data.

In addition, the operation reproduction unit 71 includes a form storage unit 73 and a circuit storage unit 75.

The form storage unit 73 stores a configuration of the conveyance units 2 and 20 constituting the conveyer device 1 and a connection between the conveyance units 2 and 20.

The form storage unit 73 is a memory that stores the layout of the conveyer device 1 as illustrated in FIG. 2 and what the conveyance units 2 and 20 in each zone are.

The circuit storage unit 75 stores the control circuit 40 incorporated in each of the conveyance units 2 and 20. The circuit storage unit 75 stores at least a part or all of the sequence circuit included in the control circuit 40 of each of the conveyance units 2 and 20.

Next, a function of the actual operation confirmation device 50 according to the present embodiment will be described.

For convenience of description, the real conveyer device 1 is referred to as "real conveyer device 1", and an adjective "real" is attached to an event that has occurred to the real conveyer device 1. Things reproduced by the actual operation confirmation device 50 are distinguished by adding an adjective "virtual".

In the actual operation confirmation device 50 according to the present embodiment, the operation reproduction video data and the energization state reproduction video data are created by the operation reproduction unit 71 on the basis of the log data input from the log data creation unit 51 to the external device 48, and the video is displayed on the display device 53.

The video can be paused, stepped forward, fast forwarded, rewound, played slow, enlarged, and the like.

The display device 53 schematically displays a layout of the real conveyer device 1 as illustrated in FIG. 2.

A figure displayed on the display device 53 is an outline figure imitating the conveyer device 1, and is a connection of rectangular figures imitating the conveyance units 2 and 20.

Figure 10A:
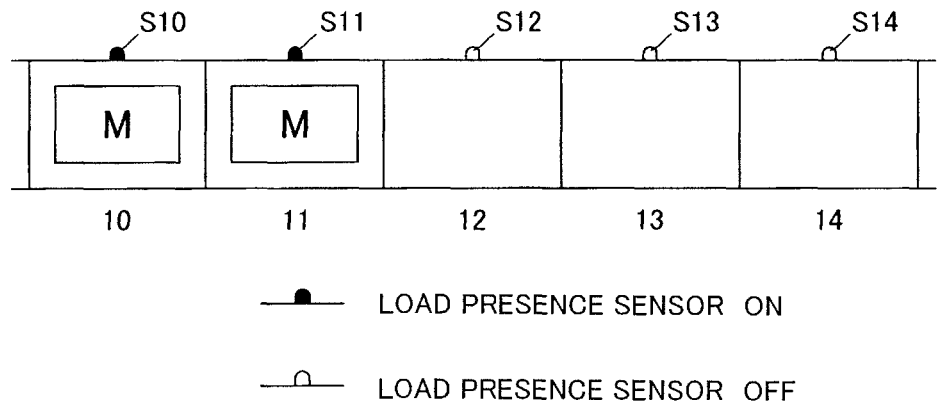
FIGS. 10A, 10B, and 10C are explanatory diagrams illustrating a video displayed on the display screen, and illustrate state change over time.

The virtual layout can be enlarged at any position as illustrated in FIG. 10. Further, in the zone where the article is placed on the real conveyer device 1, the display M imitating the article is exhibited in the virtual layout. FIG. 10A illustrates a state in which an article exists in the positions of the addresses 10 and 11. On the display screen, the date and time are displayed to clarify a point of time of the state.

A display M imitating the article is performed on the basis of the operation status of the load presence sensor S included in the log data. Specifically, in the case where the load presence sensor S of the real conveyer device 1 detects the presence of an article at a specific time and a record of the detection exists in the log data, the display M imitating the article is displayed in the virtual zone.

Further, in a zone in which the drive motor of the real conveyer device 1 is energized, a video with motion such as wavy motion is displayed in the virtual zone.

When the drive motor 15 in the zone where the article is placed in the real conveyer device 1 is energized, a video in which the virtual display M is moving is exhibited. A moving speed and a moving distance are determined by an interval and a total number of pulses transmitted by the drive motor 15.

Further, with a click on a specific zone, a video of the energization state of the conveyance units 2 and 20 constituting the zone is displayed.

For example, when there is an article in zones 10 and 11 at a specific time at which the real conveyer device 1 is operating, and load presence sensors S10 and S11 are turned on, the fact is recorded in the log data.

When there is a record that load presence sensors S10 and S11 are turned on, the operation video creation unit 80 of the operation reproduction unit 71 displays the display M in the virtual zones 10 and 11 as illustrated in FIG. 10A.

Further, in the real conveyer device 1, when the articles in the zones 10 and 11 are conveyed to a zone 12, a record remains that the drive motor 15 in the zones 10, 11, and 12 is turned on and energized in the log data.

Figure 10B:
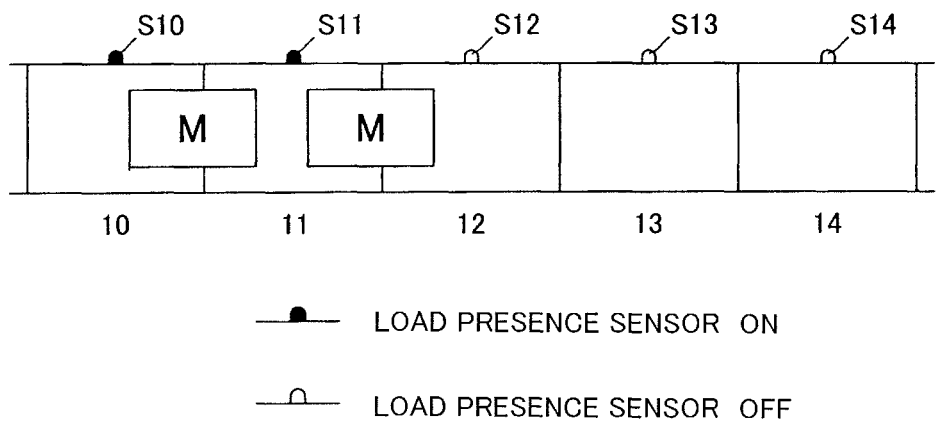

When the load presence sensors S10 and S11 are turned on and there is a record that the drive motor of the zones is turned on and energized, the operation video creation unit 80 of the operation reproduction unit 71 moves the display M of the virtual zones 10 and 11 as illustrated in FIG. 10B.

In the real conveyer device 1, when the article M in each of the zones 10 and 11 has been moved to the zones 11 and 12, a record that the load presence sensors S11 and S12 are turned on remains in the log data.

Figure 10C:
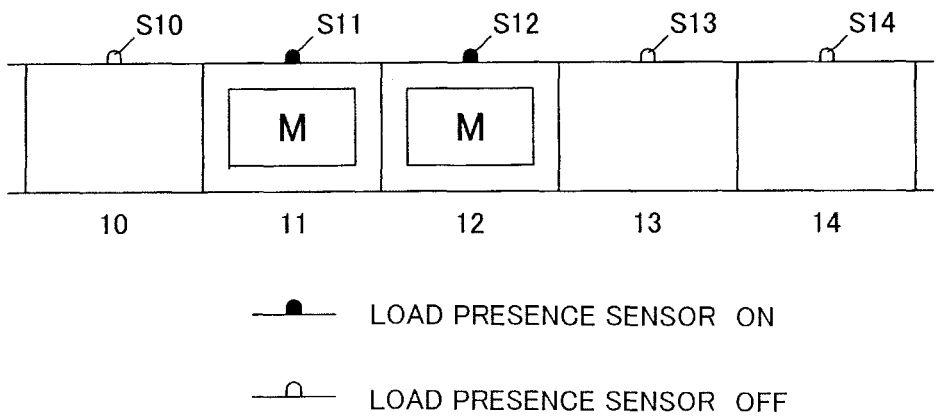

When there is a record that the load presence sensors S11 and S12 are turned on, the operation video creation unit 80 displays the display M in the virtual zones 11 and 12 as illustrated in FIG. 10C.

Further, in the actual operation confirmation device 50 according to the present embodiment, the energization state of each of the conveyance units 2 and 20 is displayed on the display device 53. The display can be displayed on the same screen as the layout described above, or can be displayed by switching screens.

Furthermore, the actual operation confirmation device 50 can perform individual reproduction of reproducing the operation of the sequence circuit of the control circuit 40 that designates the zone controller (conveyance unit) 10 by specifying the zone and controls the zone, and can perform multiple reproduction of simultaneously reproducing the operation of the sequence circuit of the control circuit 40 that designates a plurality of zones and controls the zones.

Figure 11A:
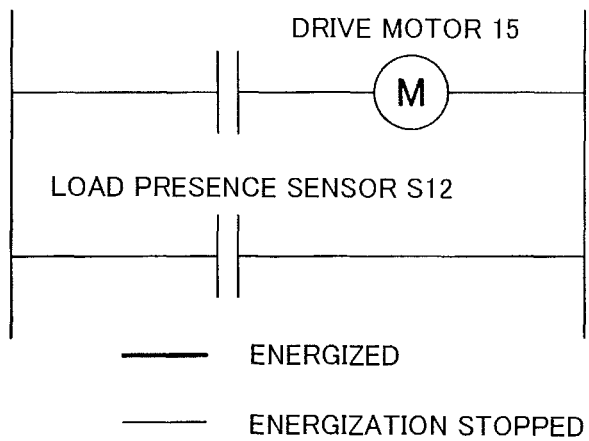
FIGS. 11A, 11B, and 11C each illustrate a sequence circuit of a zone 12 displayed on the display screen, and illustrate energization states at an identical time to FIGS. 10A, 10B, and 10C, respectively.
Figure 11B:
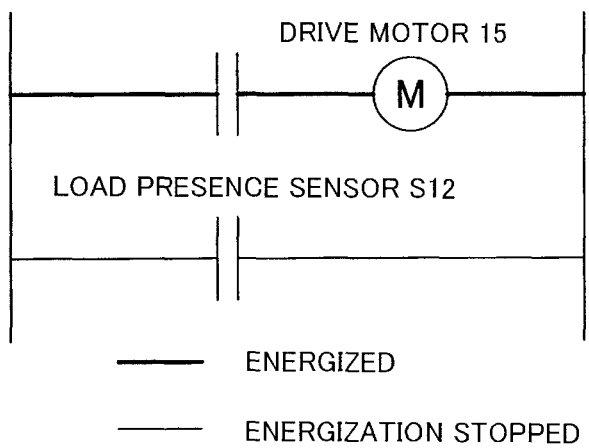
Figure 11C:
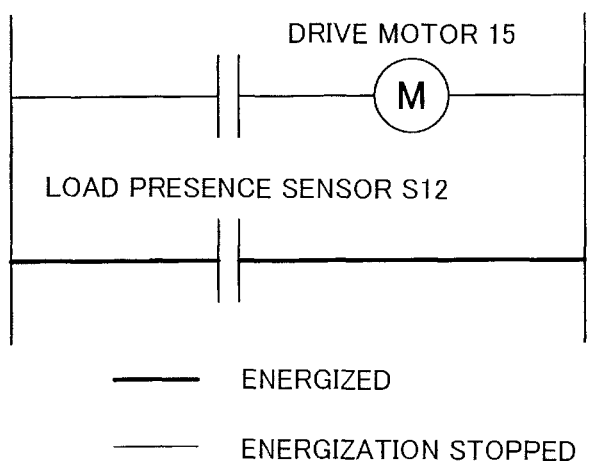

FIGS. 11A to 11C each illustrate a video showing an energization state of the conveyance unit 2 in the zone 12.

In accordance with the above example, at a specific time, in the real conveyer device 1, the article M exists in the zones 10 and 11, but the article M does not exist in the zone 12 as a display target.

Therefore, the load presence sensor S12 is turned off. Further, the drive motor 15 of the conveyance unit 2 in the zone 12 is turned off and stopped, and the drive motor 15 is not energized. These facts are recorded in the log data.

FIG. 11A corresponds to FIG. 10A. The load presence sensor S12 is turned off, and the drive motor 15 is also turned off in the virtually displayed circuit.

In accordance with the above example, in the real conveyer device 1, when the article in the zones 10 and 11 is conveyed to the zone 12, a record that the drive motor 15 in the zone 12 is energized remains in the log data.

FIG. 11B corresponds to FIG. 10B. In the circuit displayed on the display device 53, the load presence sensor S12 is turned off and the drive motor 15 is turned on.

In the real conveyer device 1, when the article in the zone 11 has been moved to the zone 12, a record that the load presence sensor S12 is turned on, the drive motor 15 is turned off, and the energization is stopped remains in the log data.

FIG. 11C corresponds to FIG. 10C. In the circuit displayed on the display device 53, the load presence sensor S12 is turned on, and the drive motor 15 is turned off.

Even in a case where there is some kind of error in the real conveyer device 1, the load presence sensor S, the driving status of the drive motor, and the like at that time are recorded in the log data.

It is therefore possible to reproduce an occurrence situation of the error virtually. Further, a state of an electric circuit at that time can be confirmed. Thus, a cause of a failure or the like can be easily found.

Final Specification Creation Step

The final specification creation step is performed using a final specification creator. The final specification creator includes computer software capable of capturing a figure, processing the figure, and inputting characters.

As illustrated in FIGS. 12A, 13A, 14A, and 15, the final specification creator stores a plurality of preset fixed phrases and display fields 300, 301, 303, and 305 corresponding to the fixed phrases.

Examples of the fixed phrases include phrases indicating an outline of a device such as "layout", phrases indicating a communication line such as "network configuration", and phrases indicating a position of a zone such as "IP address setting".

Figure 12A:
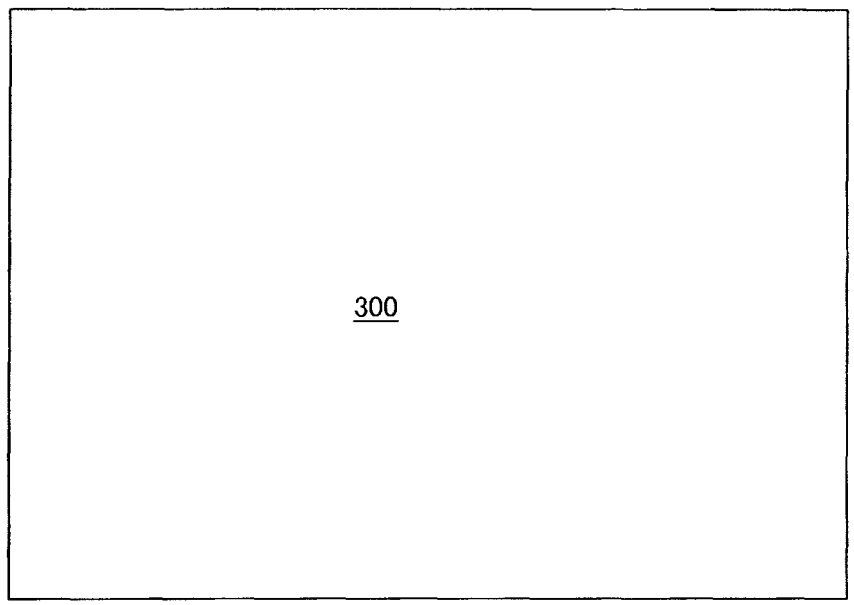

As illustrated in FIG. 12A, the display field 300 to which characters and figures for "layout" are applied is secured.

In addition, a table including characters such as "logic name", "third octet", and "node number" as illustrated in FIG. 13A is stored. The "node number" is an identification number of the zone controller 10, and is the same as the number of the zone in the present embodiment. A specific logic name is stored. The table has the display field 301 in which characters are filled.

Figure 14A:
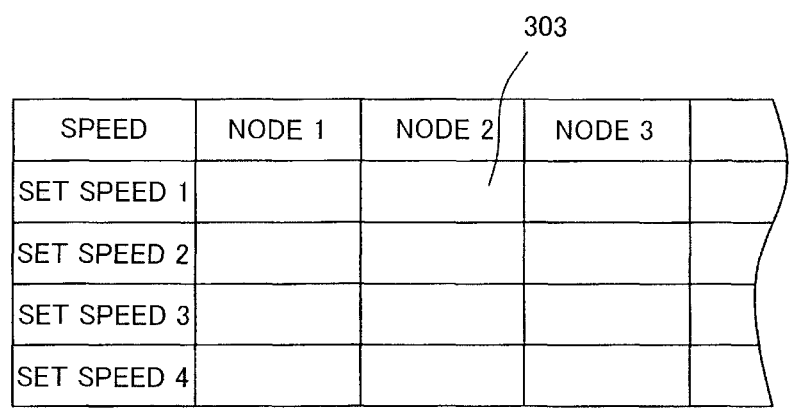

FIG. 14A illustrates an example in which a set speed of the motor is posted on the final specification creator. In FIG. 14 A, a table including characters such as "speed", "set speed 1, 2, 3, 4", and "node number" is stored. The table has the display field 303 in which characters are filled.

In the present embodiment, the speed of each motor can be changed in four stages, and the set speed at each stage is posted on the final specification creator. For example, there is a case where the rotation speed is switched for each situation, for example, when each motor is rotated at a low speed immediately after activation and rotated at a high speed after a certain period of time, and the set speed at each stage is posted in the final specification creator.

FIG. 15 illustrates an example when various settings, types of constituent members, and the like are posted on the final specification creator, and a table having "node number" and "item" fields is stored. In FIG. 15, characters such as "sensor setting", "sensor alarm setting", "motor type", "rotation direction switching", "special function", "number of gear stages", "mechanical brake", "brake", "motor and motor port setting switching", "motor lock timeout", "servo brake current limit", "motor current limit", "substrate thermal generation temperature", and "substrate thermal release temperature" are indicated in the field of "item". In addition, a table including characters such as "node number" is also stored in the table in FIG. 15. The table has the display field 305 in which characters are filled.

"Sensor setting" and "sensor alarm setting" indicate a relationship between a detection status of the load presence sensor S and the like and the output signal, and "dark-on" is a setting in which an H signal is output when a photo-sensor does not detect light.

The "number of gear stages" is the number of stages of a reduction gear of the motor-incorporating roller. The "brake" is a type of brake of the motor-incorporating roller.

The "motor lock timeout" is a time during which energization continues to stop when the motor is forcibly stopped by an external force.

The "servo brake current limit" is an upper limit of a current applied to a servo brake, and the "motor current limit" is an upper limit of a current applied to the motor-incorporating roller.

The "substrate thermal generation temperature" is a temperature at which power supply is stopped when a temperature of the substrate excessively rises. The "substrate thermal release temperature" is a temperature at which power supply is restarted.

Then, the information regarding the layout of the conveyance device 1 to be manufactured and the data input in the input step and the data corrected in the correction step are input to the final specification creator. Further, a type of control logic of the zone controller 10 of each zone, various setting values, and information for specifying the zone controller 10 are input.

As the information regarding the layout of the conveyance device 1, data output from the computer used in the specification confirmation step and the virtual operation confirmation step is captured.

Figure 12B:
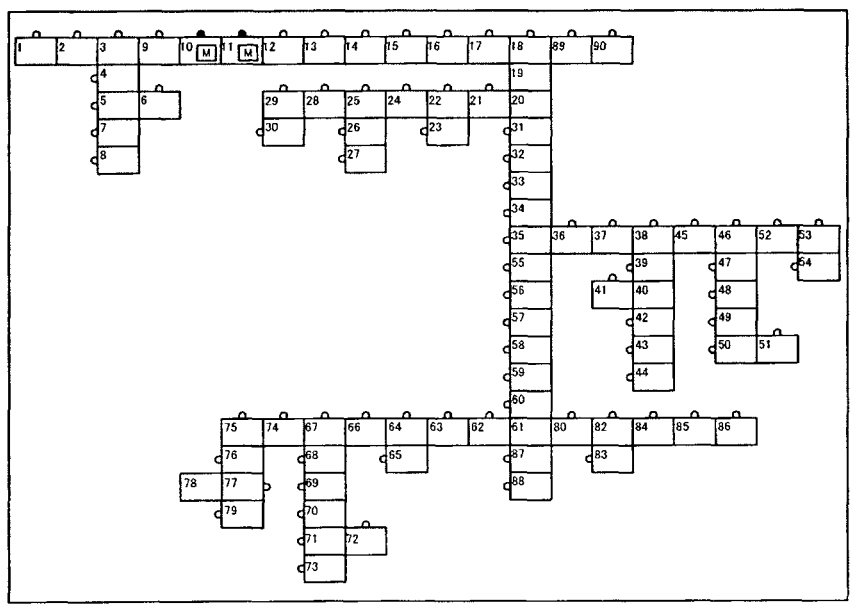

Then, as illustrated in FIG. 12B, the figure of the layout is filled in a predetermined position.

Explanatory notes and the like are added as necessary.

The data input in the input step, the data corrected in the correction step, the type of the control logic of the zone controller of each zone, and the information specifying the zone controller are obtained from the data output from the computer used in the virtual operation confirmation step.

Figure 14B:
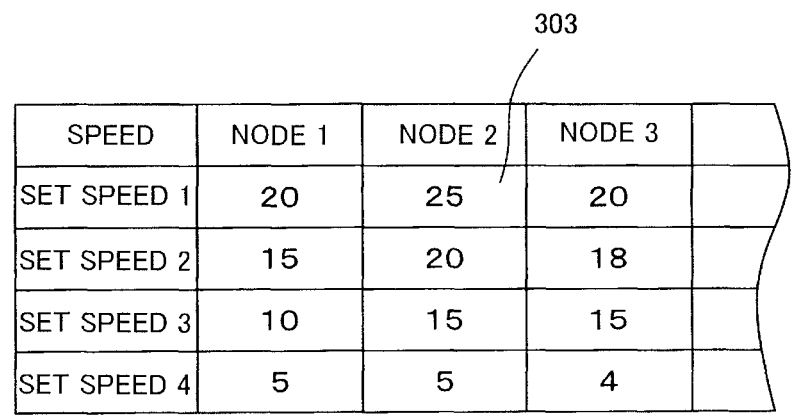

Then, as illustrated in FIGS. 13B, 14B, and 16, necessary items are written in predetermined places.

The contents and items described in the final specification are arbitrary. In addition to a normal layout, a drawing illustrating a distribution destination of the conveyed object, a drawing illustrating a position of a sensor, a switch, or the like, a drawing illustrating a communication path, and a drawing illustrating an IP address may be included.

The information after data input is stored and printed out as necessary.

In the embodiment described above, two representative conveyance units are exemplified, but the structure and form of the conveyance unit are not limited to these two types.

For example, the conveyance units may form a curved path or guide a course of an article with a bar or the like.

The simple control circuit 40 has been described above as an example in order to facilitate understanding. However, the actual control circuit 40 is more complex.

Further, some actual conveyer devices have a zone without a load presence sensor, and other actual conveyer devices have a zone that is constantly driven. However, the present invention does not exclude conveyer devices including such zones.

The circuit displayed on the display device 53 may be a still image.

In the embodiment described above, it has been described that the load presence sensor S is turned on when an article is detected, but may be turned off when an article is detected.

In the embodiment described above, the parameter acquisition step is performed in the virtual operation confirmation step. That is, although the virtual operation confirmation device 107 includes the appropriate parameter selection program 235, the specification confirmation device 106 may include the appropriate parameter selection program 235.

EXPLANATION OF REFERENCE NUMBERS

1: conveyer device
2: conveyance unit
10: zone controller
20: conveyance unit
40: control circuit
46: host controller
48: external device
50: actual operation confirmation device
51: log data creation unit
52: controller
53: display device
71: operation reproduction unit
72: communication unit
80: operation video creation unit
81: circuit video creation unit
90: operation confirmation device
100: conveyer system
106: specification confirmation device
107: virtual operation confirmation device
203: computer program for specification confirmation step
205: computer program for virtual operation confirmation step
206: computer program for actual operation confirmation step
210: operation instruction unit
211: conveyance destination instruction unit
212: state monitoring unit
220: layout creation program
221: video creation program
230: automatic parameter assignment program
231: parameter correction program
235: appropriate parameter selection program
236: parameter assignment program
242: conveyed object information input unit
300: display field
301: display field
303: display field
305: display field

The invention claimed is:

1. A method for manufacturing a conveyance device, wherein the conveyance device comprises:
a host controller; and
a plurality of conveyance units each including an individual controller that controls each of the conveyance units,
the individual controller of each conveyance unit including:
a control circuit configured to input data regarding control; and
a communication unit that communicates with the host controller, and
wherein the method comprises:
(a) confirming a required operation of the conveyance device by exhibiting a desired operation of the conveyance device in a video using at least one operation confirmation device that is configured to visually confirm an operation of the conveyance device;
(b) confirming virtually the operation of the conveyance device by exhibiting the operation of the conveyance device in a video based on the data that has been input into the operation confirmation device, the data being for realizing the required operation or an operation similar to the required operation;
(c) inputting the data into the individual controller of the actual plurality of conveyance units; and (d) confirming actually the operation of the conveyance device after step (c) by acquiring log data of the individual controller of each of the conveyance units whereby the log data includes information on actual operation of each of the conveyance units and a time of acquisition of the information, storing the log data in a log data storage unit, inputting the log data stored in the log data storage unit to the operation confirmation device, and reproducing the operation of the conveyance device in a video.

2. The method according to claim 1, comprising (e) correcting the data that is confirmed as an error in step (d).

3. The method according to claim 2,
wherein a final specification creator is used to store a plurality of fixed phrases and display-fields corresponding to the plurality of fixed phrases,
wherein information about a layout of the conveyance device to be manufactured and data input in step (c), and/or data corrected in step (e) are input into the final specification creator, and
wherein a document in which the layout and a description based on the data are written in the display fields is created.

4. The method according to claim 1, wherein the data is corrected to approximate to the required operation in step (b).

5. The method according to claim 1,
wherein a final specification creator is used to store a plurality of fixed phrases and display-fields corresponding to the plurality of fixed phrases,
wherein information about a layout of the conveyance device to be manufactured and data input in step (c) are input into the final specification creator, and
wherein a document in which the layout and a description based on the data are written in the display fields is created.

6. The method according to claim 1,
wherein the individual controller includes a basic control circuit,
wherein a parameter required for a specific operation can be input as one of the data, and
wherein a parameter for executing the operation of the conveyance device exhibited in step (a) is acquired and is input into the operation confirmation device when step (b) is performed.

7. The method according to claim 1,
wherein the individual controller includes a basic control circuit,
wherein a parameter required for a specific operation can be input as one of the data, and
wherein a parameter acquired from the data used in step (b) is input into the individual controller in step (c).

\* \* \* \* \*